3,376,238
PROCESS FOR FORMING CROSSLINKED ORIENTED, MICROPOROUS POLYOLEFIN FILM
Razmic S. Gregorian, 8460 Piney Branch Court, Silver Spring, Md. 20901, and Charles C. Kirk, 2808 Johns Hopkins Road, Laurel, Md. 20810
No Drawing. Continuation-in-part of application Ser. No. 337,186, Jan. 13, 1964. This application May 19, 1966, Ser. No. 551,248
4 Claims. (Cl. 260—2.5)

ABSTRACT OF THE DISCLOSURE

A process for forming crosslinked biaxially oriented, microporous, polyolefin-containing film comprising admixing said polyolefin with a finely divided pore forming solid, heating the mixture above the melting point of the polyolefin to shape same in the form of film, crosslinking the shaped mixture by either adding an organic compound capable of generating free-radicals or employing ionizing irradiation and thereafter extracting the pore forming solid at a temperature below the degradation temperature of the crosslinked polyolefin. The polyolefin film can, if desired, be biaxially oriented either after the crosslinking step or after the extraction of the pore forming solid.

---

This application is a continuation-in-part of our prior copending application Ser. No. 337,186 filed Jan. 13, 1964 now abandoned.

This invention relates to a novel and useful composition of matter, a process utilizing the composition and the product resulting from the process. More particularly, it is directed to filled polyolefin containing compositions, e.g. polyethylene, polypropylene and copolymers of ethylene and vinyl monomers, a process employing said compositions and the microporous product resulting therefrom.

It is known in the art to render thermoplastic polymers microporous by including therein a pore-forming solid which is subsequently removed. The pore-forming solid is extracted at low temperatures which do not cause physical or chemical changes, e.g. swelling of the polymer. This necessitates prolonged extraction periods and adds considerably to the production cost of forming microporous polymers. In addition, the resulting microporous thermoplastic resin has a low melting or softening temperature and low resistance to organic solvents. For example, low density polyethylene softens and loses its shape in boiling water. Furthermore, said polyethylene is soluble in xylene and similar organic solvents particularly at elevated temperatures. Such drawbacks greatly deter forming microporous material from polyethylene since its commercial usefulness is curtailed by such short comings.

One object of this invention is to provide a process for greatly increasing the physical and chemical resistance of microporous polyolefins to organic solvents.

An additional object of the present invention is to devise a process whereby extraction of the pore-forming solids can be carried out at an increased rate at elevated temperatures. Yet another object is to provide a novel process for decreasing the solubility of microporous polyolefins in organic solvents. Still another object is to provide a biaxially oriented, crosslinked, polyolefin film having micropores. A further object is to provide a crosslinked, heat-shrinkable, microporous polyolefin film.

Other objects and advantages will become apparent from a reading of the following description of the invention.

The aforestated objects are accomplished by the present invention which provides a composition of matter comprising a polyolefin selected from the group consisting of (A) Polyethylene, polypropylene and ethylene-vinyl copolymers, (B) 20–400% by weight by said group member of a pore-forming soild and (C) 0.1–10% by weight by said group member of an organic compound capable of generating free-radicals, preferably an organic peroxide.

The present invention also provides a process for forming microporous crosslinked polyolefin which comprises (1) Forming a substantially homogeneous mixture of normally solid polyolefins selected from the group consisting of polyethylene, polypropylene and ethylene-vinyl copolymers, 20–400% by weight of said group member of a pore-forming solid and 0.1–10% by weight of said group member of a free radical generating crosslinking agent, (2) Shaping the mixture into a desired shape, e.g. sheet or film, having a thickness of 0.1 to 40 mils at temperatures sufficient to melt the polyolefin below the gel point of the mixture, (3) Curing the shaped mixture to form a thermoset polyolefin by heating the mixture to at least the decomposition temperature of the crosslinking agent and (4) Thereafter extracting the pore-forming solid from the polyolefin with a suitable solvent at temperatures up to the degradation temperature of the crosslinked polymer.

The following steps are considered variations of and a part of the process of the instant invention.

After step three in the above process, i.e. curing the polyolefin by heating to a higher temperature, it is sometimes desirable and often preferable to orient, uniaxially or biaxially, the polyolefin at temperatures within about 10° C. below its melting point up to its normal extrusion temperature. The addition of such a step to the process aids in removing the uneffected pore-forming solid from its expanded surroundings. After removal of the pore-forming solid, the oriented porous film can be reheated to heat shrink the film. Alternatively, it is possible to perform the orientation step after dissolving out the pore-forming solid to obtain a heat shrinkable film on reheating. This method has the advantage that the temperature employed during the extraction of the pore-forming solid can be elevated to the normal extrusion temperature of the crosslinked polyolefin without effecting subsequent orientation and heat shrinkability.

A further innovation of the instant invention is the use of irradiation instead of chemical means to crosslink the polyolefin.

The invention further provides the crosslinked, microporous, polyolefin-containing product and the crosslinked, heat-shrinkable, microporous, polyolefin-containing product in the form of sheet and film.

Although the invention relates to polyolefins selected from the group consisting of ethylene, propylene and ethylene-vinyl copolymers, for purposes of brevity the invention will be described mainly in terms of polyethylene unless otherwise noted. However, it should be understood that when the term polyethylene is used, the other polyolefin group members are meant and included. Thus, ethylene-vinyl copolymers such as ethylene-vinyl acetate, ethylene-vinyl chloride, ethylene-ethyl acrylate and the like are included in this invention.

The invention further provides the crosslinked, microporous polyethylene product in the form of sheet and film.

As used herein the term "pore-forming solid" means any material 0.1 to 10 microns in diameter which can be extracted from the polyethylene by selected solvents or by vacuum at a temperature below the degradation temperature of the crosslinked polyethylene. Heretofore extraction of the pore-forming solid from thermoplastic polyethylene was of necessity performed with suitable solvents at temperatures below the softening point of the polymer to avoid loss of shape of the polymer and swelling of the polymer which caused blocking of the pores. By the practice of this invention, one is able to extract the pore-forming solids at temperatures above the crystalline melting point, i.e. up to the degradation temperature of the polymer due to the fact that the polyethylene is now thermoset. Such high temperature extraction allows one to perform the extraction step at a greatly increased rate without fear of distorting the final shape of the polymer.

Similarly as used herein the term "selected solvents" means a vacuum or any solvent that will dissolve the pore-forming solid at a temperature below the degradation temperature of the crosslinked polyethylene. Examples of suitable pore-forming solids and selected solvents therefor are almost endless and will be immediately evident to those skilled in the art. Pore-forming solids and selected solvents therefor include, but are expressly not limited to, the examples in the following listing:

| Pore-forming solids: | Selected solvents |
|---|---|
| Sugar; sodium chloride; $Na_2CO_3 \cdot 10H_2O$; sodium benzoate; sodium acetate | Water. |
| Silica gel | Aqueous sodium hydroxide. |
| Starch; sugar | Dilute sulfuric acid. |
| Benzoic acid | Carbon tetrachloride xylene. |
| Hydroquinone | Ethyl alcohol; ethylene glycol. |
| Dimethylterephthalate; anthracene | Vacuum at 20–200° C. |

The term "gel point" as used herein means the point at which a three dimensional network of molecules is formed in the polymer. When crosslinking by chemical means using a free radical generating crosslinking agent, the "gel point" means those temperatures at which there is sufficient decomposition of the crosslinking agent to cause gel formation i.e., a three dimensional network of molecules in the polymer. The gel point of any specific mixture depends upon numerous factors, including e.g., the particular polyolefin, the particular crosslinking agent, the amount of crosslinking agent, and the half-life of the crosslinking agent at various shaping temperatures. As the gel point of any specific mixture is dependent on so many factors, it is best determined by empirical methods, e.g., by extruding a small sample and observing or determining whether any gel formation is present. In a continuous operation the shaping step in the instant invention is carried out prior to crosslinking the polymer at temperatures which preclude gel formation in the polymer thus insuring against plugging of the shaping mechanism such as an extruder. Subsequent to shaping, the temperature of the shaped mixture is elevated to the gel point. In the examples herein where individual or batch samples in the form of film are processed, it is possible, if desired, to substantially shape and chemically crosslink simultaneously.

As used herein the term "decomposition temperature" of the crosslinking agent means a temperature at which the crosslinking agent has a half-life of less than about 1.0 minute and preferably less than about 0.5 minute. This can best be determined by one skilled in the art empirically.

Crosslinking agents do not ordinarily have a sharp decomposition point, except possibly at very high temperatures. In the usual case, the agent requires several minutes to decompose substantially quantitatively, and the rate of decomposition at a given instant is generally proportional to the amount of material. Consequently, the decomposition rate for a given material at a given temperature can generally be determined by its half-life at that temperature. The half-life of any free-radical generating agent can be readily determined by one skilled in the art. In the case of peroxides, for example, the determination involved is described in Doehnert et al., Evaluation of Organic Peroxides on the Basis of Half-Life Data, Ann. Tech. Management Conf., Reinforced Plastics Div., Soc. Plastics Ind., Inc., 13, Sect. 1–B, 1–8 (1958); Chem. Abs., 53, 19534i (1959).

Organic compounds capable of generating free radicals which are operable as crosslinking agents in the instant invention include organic peroxygen compounds and azo compounds. Suitable organic peroxygen compounds include but are expressly not limited to dicumyl peroxide, 1,2-bis($\alpha$-cumylperoxyisopropyl)benzene, 1,3-bis($\alpha$-cumylperoxyisopropyl)benzene, 1,4-bis($\alpha$-cumylperoxyisopropyl)benzene, tert-butyl perbenzoate, 1,2-bis(t-butylperoxyisopropyl)benzene, 1,3-bis(t-butylperoxyisopropyl)benzene, 1,4-bis(t-butylperoxyisopropyl)-benzene, 2,5-dimethyl-2,5-di-(tert-butylperoxy)hexane and 2,5-dimethyl-2,5-di-(tert-butylperoxy)-3-hexyne. Operable azo compounds include 2-phenylazo-2,4-dimethylvaleronitrile, 2-phenylazoisobutyronitrile, 2,4,4-trimethylvaleronitrile, 2-phenyl-azo-isobutyramide and the like.

The following is a list of a few of the operable crosslinking agents and their half-life.

| Crosslinking agent: | Half-life |
|---|---|
| Di(tert)-butyl) peroxide | 1 minute at 190° C. |
| Tert-butyl hydroperoxide | 1 minute at 230° C. |
| Dichlorobenzyl peroxide | 1 minute at 112° C. |
| Tert-butyl peracetate | 0.5 minute at 178° C. |
| Dicumyl peroxide | 0.6 minute at 182° C. |
| Diethyl peroxide | 1 minute at 198° C. |
| Di(tert-amyl) peroxide | 1 minute at 182° C. |
| Cyclohexyl peroxide | 0.5 minute at 226° C. |
| 2,5-dimethyl-2,5-di-(tert-butyl-peroxy) hexane | 0.6 minute at 185° C. |
| 2,5-dimethyl-2,5-di-(tert-butyl-peroxy)-3-hexyne | 0.6 minute at 192° C. |
| $\alpha,\alpha'$ - Azobis ($\alpha,\gamma,\gamma$ - tri-methylvalero-nitrile | 2 minutes at 91° C. |
| $\alpha,\alpha'$ - Azobis ($\alpha$ - cyclopropyl-proprionitrile) | 1 minute at 118° C. |
| Dimethyl - $\alpha,\alpha'$-azodiisobutyrate | 2 minutes at 138° C. |
| $\alpha,\alpha'$-Azodiisobutyronitrile | 2 minutes at 132° C. |
| Azodicyclohexane carbonitrile | 2 minutes at 166° C. |
| $\varphi$ - hydroxyethylazo - $\alpha,\gamma$ - dimethylvalero-nitrile | 2 minutes at 182° C. |

The crosslinking agents can be used singly or in combination. It is only necessary that the "gel point" of the mixture be sufficiently high to enable shaping of the mixture in an extruder or other shaping mechanism at temperatures above the melting point of the polymer without crosslinking occurrying.

Any of the various well-known types of polyethylene can be used in making film by the process of this invention. Such polyethylenes include the branched low-density (i.e. about .010 to about .925) material having melting points in the range 90–110° C., as well as the medium density materials and the newer linear high density (about .950 to .980) materials made by the Ziegler process ($TiCl_4$-Al alkyl catalyst) and the Phillips process (hexavalent chromia on silica-alumina support). The linear polyethylenes have melting points in the range of 120–

137° C. and therefore require peroxides (or other free-radical generating crosslinking agents) that provide gel points higher than these melting point temperatures.

The crosslinking step to form thermoset polyethylene in addition to being accomplished by chemical means can be performed by ionizing radiation of either the particle or electromagnetic type as will be shown hereinafter. Such radiation has an energy of at least about 0.01 mev. While the irradiation step to crosslink the polyethylene to gelation is preferably carried out using corpuscular particles it is also operable with X-rays or gamma rays. Thus positive corpuscular particles such as protons, alpha particles and denterons in addition to electrons and neutrons are operable to bombard the polymer.

Although the irradiation step in the examples herein used a Van de Graaff electron accelerator as the irradiation source, it should be understood that the present invention is not limited thereto. The particles may be accelerated to high speeds by means of various voltage gradient mechanisms such as a cyclotron, a Cockroft Walton accelerator, a resonant cavity accelerator, a betatron, a GE resonant transformer, a synchroton, and the like. Furthermore, particle irradiation may also be supplied from radioactive isotopes or an atomic pile. It is also possible to crosslink the polymers by the use of a sensitizer, e.g. benzophonone and U.V. light.

When irradiation is employed instead of chemical means to crosslink the polymer, the upper limit of the temperature range of the shaping step to put the polymer containing the pore-forming solid in the form of film is no longer limited to the decomposition temperature of the crosslinking agent. Thus it is possible to perform the shaping operation at temperatures ranging from the melting point of the polymer up to temperatures 150° C. in excess thereof, preferably between the melting point and 75° C. thereabove.

The amount of irradiation necessary to crosslink the polyethylene to gelation by the practice of this invention is a dose in the range of 0.1 to 100 megarads. Obviously, the dosage is dependent upon the molecular weight of the polymer prior to irradiation with a lesser dosage required for higher molecular weight polymer and vice versa.

The resultant crosslinked, microporous polyethylene product of the present invention has many and varied uses. For example, it can be used to make battery separators and the like. It is especially useful as a material having pores which will permit gases, e.g. oxygen, to pass therethrough but which are of such size as to prevent the passage of water. Thus the product would be useful as a raincoat or covering such as a tent or the like which allowed one to breathe oxygen without permitting the countercurrent passage of rainwater. The product is also useful in situations requiring high resistance to solvents at elevated temperatures such as a filter sheet.

The following examples are set down to illustrate the invention and are not to be deemed limiting in scope.

Throughout the instant invention the melt index (MI) of the polymer was measured under the conditions specified in ASTM D 1238–52T.

The density of the polymer was measured under the conditions specified in ASTM D 1505–57T.

The percent gel content of the crosslinked film in the instant invention was measured by refluxing a weighed sample (approximately 0.5 g.) of film in a cellulose Soxhlet thimble in xylene (containing 0.3 weight percent 2,6-ditertiary-butyl-4-methyl-phenol, commercially available under the tradename "Ionol" from Shell Oil Corp.) for 24 hours. The insoluble portion of the sample after drying was weighed to calculate percent gel as follows:

$$\text{Percent gel} = \frac{\text{weight insoluble sample}}{\text{total weight sample}} \times 100$$

In general the procedure followed for forming chemically crosslinked microporous polyethylene in the examples was to compound the polyethylene, pore-forming solid and crosslinking agent on a Brabender Plastograph, Banbury Mixer or two-roll mill at a temperature about 10–30° C. above the melting point of the polymer but below the gel point for about 5–20 minutes. It is also possible to admix the reactants, preferably in particulate form, at temperatures below the melting point of the polymer, e.g. 25° C. and thereafter heat the mixture above the melting point of the polyethylene to form a homogeneous mixture in the molten polymer. It is also sometimes preferred, especially where there is concern with premature crosslinking in the mixing or compounding step, to admix solely the polyethylene and the pore-forming solid at temperatures whereat the polymer is molten until a homogeneous mixture is realized e.g. about 10 minutes, and thereafter add the crosslinking agent with continued mixing for an additional 1–5 minutes. This decreases the possibility of premature crosslinking in the compounding step since the crosslinking agent is not exposed to an elevated temperature for so long a period. For shaping, samples of the mixture, (approximately 10–40 gms. in weight) were pressed into films of about 10–20 ml. thickness using a platen press at temperatures whereat the polymer is molten but below the decomposition temperature of the crosslinking agent. The film samples were then cured in the press for 10–30 minutes at 20,000 p.s.i. at temperatures above the gel point. After curing, the self-supporting film samples were transferred to a tank containing a selected solvent for the extraction of the pore-forming solid. For example, when starch is used as the pore-forming solid, the solvent in the tank is dilute sulfuric acid maintained at a temperature of 99–100° C. Due to the ability to employ a high temperature without detriment to the thermoset polymer, the extraction step is shortened considerably. Extraction periods of 10 min. to 3 hrs. are sufficient to leach the pore-forming material out of the polymer. The polymer is then washed to remove the solvent therefrom. Samples of the cured, microporous polyethylene film were taken to calculate the percent gel content by the aforestated xylene extraction method. The porosity of the polymer was characterized by its permeability to oxygen and water vapor.

In the process where the polymer is crosslinked by irradiation, the compounding of the polyethylene and pore-forming solid is performed at temperatures whereat the polymer is molten e.g. 10–75° C. above the melting point of the polymer. The homogeneous admixture is shaped e.g., in the form of sheet or film under pressure on a platen press or in an extruder and cooled. The shaped admixture is irradiated with a dosage of 0.5–100 megarads to crosslink the polymer. The pore-forming solid is extracted with a selected solvent as mentioned supra for the chemical crosslinking procedure.

Example 1

100 parts of commercially available polyethylene (density 0.91; melt index 2.0) and 30 parts of commerically available powdered cane sugar as a pore-forming solid having an average diameter of 2 microns were compounded on a two roll mill at about 135° C. until a homogeneous mixture was obtained. Films of 1–3 mils thickness were pressed on a platen press at about 135–140° C. The films were cooled. Samples of the pressed films were crosslinked by irradiation at dosages of 8 and 12 megarads with a Van de Graaff electron generator. The crosslinked films were immersed in a 3½% solution of sulfuric acid at a temperature of 99° C. for 60 minutes to extract the sugar from the polymer. This bath was followed by a bath of distilled water to remove the acid with subsequent drying of the film samples. On characterization the film samples irradiated at a dosage of 8 megarads had a gel content of 59% and those subjected to a dosage of 12 megarads had a gel content of 68%. The crosslinked microporous polyethylene produced by the aforementioned treatment contained pores ranging in size from 1 to 4 microns in diameter with an average pore size of about 2 microns. To show the decreased solubility of the crosslinked microporous product, samples thereof were immersed in a bath of a mixture of 50% xylene and 50% benzene at 80° C. for 3 hours. Control samples of the same polyethylene which had not been subjected to crosslinking were also placed in the solvent bath. At the end of 3 hours the uncrosslinked polyethylene had completely dissolved in the solvent while the crosslinked microporous polyethylene showed only swelling and on drying recovered its shape.

Example 2

Example 1 was repeated except that the commercially available polyethylene used had a density of 0.96 and a melt index of 0.7. The extraction of the sugar was performed by immersing the crosslinked film in a 3½% solution of sulfuric acid at a temperature of 99° C. for 90 minutes. The resultant microporous product irradiated with a dosage of 8 megarads had a gel content of 22% and the sample subjected to a 12 megarad dosage had a gel content of 35%. The crosslinked, microporous, high density polyethylene recovered its shape on drying after 5 hours at 100° C. in a bath of 100% xylene. The control sample of the polyethylene which had not been crosslinked was completely dissolved.

Example 3

Example 1 was repeated except that 100 parts of starch 3-7 microns average diameter, was used as the pore-forming solid with the 100 parts of polyethylene. The resultant crosslinked microporous product recovered its shape on drying after 5 hours in a bath of 50% xylene and 50% benzene at 80° C. A control sample which was not subjected to crosslinking by irradiation was dissolved in the xylene-benzene bath within 3 hours.

Example 4

100 parts of commercially available polyethylene (density 0.91; melt index 2.0) and 200 parts of silica gel as a pore-forming solid having an average diameter of 3-7 microns were compounded on a two roll mill at about 135° C. until a homogeneous mixture was obtained. 1.0 part of 2,5-dimethyl-2,5-di(t-butylperoxy)-3-hexyne peroxide in a benzene solution were then added as a crosslinking agent to the mixture and compounding was continued for 3 minutes. The mixture was removed from the two roll mill and samples thereof were pressed on a platen press into 10 mil thick film at 130° C., followed by a twenty minute cure in the press at 175° C. and 20,000 p.s.i. pressure. The cured film samples were then immersed for 3 hours in a 50% solution of NaOH at a temperature of 99° C. to leach the silica gel out of the polymer. After washing with distilled water, the samples were dried overnight at 50° C. On characterization the crosslinked microporous polyethylene film had a gel content of 60% and contained pores ranging in size from 2 to 7 microns in diameter. The crosslinked microporous polyethylene film recovered its shape on drying after immersion in a bath of 50% xylene and 50% benzene at 80° C. for 6 hours.

Example 5

Example 4 was repeated except that the commercially available polyethylene had a density of 0.96 and a melt index of 0.7 and the crosslinking agent consisted of 0.75 part of 2,5-dimethyl-2,5-di(tert-butylperoxy) - 3 - hexyne. Characterization showed that the crosslinked, microporous polyethylene film had a gel content of 40% and contained pores ranging in size from 3 to 6 microns in diameter. The resultant crosslinked microporous product was immersed in a bath of 100% xylene at 100° C. After 5 hours the crosslinked microporous polyethylene showed swelling and on drying recovered its shape.

The following examples show the inclusion of the biaxial orientation step in the invention.

Example 6

100 parts of commercially available polyethylene (density 0.91; melt index 2.0) and 15 parts of commercially available powdered cane sugar as a pore-forming solid having an average diameter of 2 microns were compounded on a Brabender Plastograph at a temperature of 140° C. until a homogeneous mixture was obtained. The mixture was removed from the Brabender Plastograph and pressed into films of 20 mil thickness at 350° F. on a platen press. The films were cooled. Samples of the pressed film were crosslinked by irradiation at a dosage of 8 megarads with a Van de Graaff electron generator. The thus irradiated film samples were then biaxially oriented under 5 lbs. air pressure at a temperature of 120° C. until it had an elongation ratio of 4×. A sample of the biaxially oriented film was accurately weighed and placed in a water bath at 40° C. for 1 hour to extract the pore-forming solid. The crosslinked, microporous polyethylene produced by the aforementioned treatment contained pores ranging in size from 6 to 10 microns in diameter with an average pore size of about 8 microns. The heat-shrinkable film was shrunk by reheating it to 100° C. to shrink the film to substantially its original size. Remeasurement of the pores of the film showed that the pores ranged in size from 1 to 3 microns in diameter with an average pore size of about 2 microns.

Example 7

100 parts of commercially available ethylene-propylene copolymer containing 70% ethylene by weight and having a density of 0.928 and 30 parts of commercially available powdered cane sugar as a pore-forming solid having an average diameter of 2 microns were compounded on a Brabender Plastograph at 180° C. until a homogeneous mixture was obtained. The mixture was removed from the Brabender and pressed on a platen press at 400° F. to form 20 mil thickness film. The thus formed film were crosslinked by irradiation and a dosage of 8 megarads with a Van de Graaff electron generator. The thus irradiated film samples were then biaxially oriented under 5 lbs. air pressure until it had an elongation ratio of 3×. The thus crosslinked, oriented copolymer film was immersed in a 3½% solution of sulfuric acid at a temperature of 99° C. for 60 minutes to extract the sugar from the copolymer. This bath was followed by a bath in distilled water to remove the acid with subsequent drying of the film samples. On characterization the film samples had a gel content greater than 15%. The crosslinked, biaxially oriented, microporous copolymer contained pores ranging in size from 4 to 8 microns in diameter with an average pore size of 6 microns. The film sample was reheated at 165° C. to heat shrink the film. Reexamination of the heat-shrunked film showed that the average pore size was about 2 microns.

Example 8

Example 7 was repeated except that commercially available polypropylene having a density of 0.91 was substituted for the copolymer. The Brabender temperature was 185° C. The mixture was removed from the Brabender and pressed into films of about 20 mil thickness on the platen press at about 180° C. The films were cooled. Samples of the pressed film were crosslinked by irradiation at a dosage of 20 megarads with a Van de Graaff electron generator and then heated for 5 minutes at 150° C. The thus crosslinked film was then biaxially oriented under 5 pounds air pressure at 150° C. until it had an elongation ratio of 3×. The crosslinked films were immersed in a 3½% solution of sulfuric acid at a temperature of 99° C. for 60 minutes to extract the sugar from the polymer. This bath was followed by a bath in distilled water to remove the acid with subsequent drying of the film samples. On characterization the film samples contained pores ranging in size from 4 to 8 microns and an average pore size of about 6 microns. The film was reheated to 165° C. thereby yielding microporous film having an average pore size of 2 microns.

On repeating the example except that the crosslinking by irradiation and heating was omitted, the biaxial orientation resulted in an elongation ratio of 4×. After extraction of the sugar, the film contained pores ranging in size from 6 to 10 microns with an average pore size of about 8 microns. On reheating the film to 160° C. the average pore size was 2 microns.

Example 9

100 parts of commercially available polyethylene density of 0.91; and a melt index 2.0 and 30 parts of commercially available powdered cane sugar as a pore-forming solid having an average diameter of 2 microns were compounded on a two roll mill at about 130° C. until a homogeneous mixture was obtained. Films of 20 mil thickness were pressed on a platen press at about 135° C. Samples of the pressed films were crosslinked by irradiation at a dosage of 8 megarads with a Van de Graaff electron generator. The crosslinked films were washed with a 3½% solution of sulfuric acid at a temperature of 99° C. for 60 minutes to extract the sugar from the polymer. The films contained pores ranging in size from 1 to 3 microns in diameter. The films were then biaxially oriented at a temperature of 100° C. and 5 lbs. air pressure until the film had an elongation ratio of 4×. On characterization the thus biaxially oriented crosslinked films contained pores ranging in size from 6 to 10 microns in diameter with an average pore diameter size of 8 microns. On reheating the film to 95° C. the pores ranged in size from 1 to 3 microns in diameter with an average pore size of about 2 microns.

Example 10

100 parts of commercially available polyethylene having a density of 0.96 and a melt index of 5.0 and 30 parts of commercially available powdered cane sugar as a pore-forming solid having an average diameter of 2 microns were compounded on a Brabender Plastograph at a temperature of 140° C. until a homogeneous mixture was obtained. 1.0 part of 1,4-bis(t-butylperoxyisopropyl) benzene was then added as a crosslinking agent to the mixture and compounding was continued for 2 minutes. The mixture was removed from the Brabender and samples thereof were pressed on a platen press into 20 mil thick film at 150° C. followed by a 20 minute cure in the press at 175° C. and 20,000 p.s.i. pressure. The cured film samples were then biaxially oriented under 5 lbs. air pressure until they had an elongation ratio of 4×. The biaxially oriented films were then immersed in a 3½% solution of sulfuric acid at a temperature of 99° C. for 60 minutes to extract the sugar from the polymer. This bath was followed by a bath in distilled water to remove the acid with subsequent drying of the film samples. On characterization the film samples contained pores ranging in size from 4 to 8 microns with an average pore size of about 6 microns. The films were reheated to 130° C. thereby yielding crosslinked microporous film having an average pore size of 2 microns.

The following examples shows the operability of ethylene-vinyl copolymers in the instant invention.

Example 11

100 parts of a commercially available copolymer of ethylene-vinylacetate sold under the tradename "Elvax" containing 33 weight percent of vinylacetate, having a melt index of 25 and a density of 0.957 and a softening point of 115° C. in accord with ASTM D–28 and 30 parts of a commercially available powdered cane sugar as a pore-forming solvent having an average diameter of 2 microns were compounded on a Brabender Plastograph at a temperature of 140° C. until a homogeneous mixture was obtained. Films of 20 mils thickness were pressed on a platen press from the thus formed mixture at about 135° C. Samples of the pressed films were crosslinked by irradiation at a dosage of 8 megarads with a Van de Graaff electron generator. The thus crosslinked films were then biaxially oriented under 5 lbs. air pressure at 105° C. until they had an elongation ratio of 3×. The crosslinked, biaxially oriented films were immersed in a 3½% solution of sulfuric acid at a temperature of 99° C. for 60 minutes to extract the sugar from the polymer. This bath was followed by a bath in distilled water to remove the acid with subsequent drying of the film samples. On characterization the film samples contained pores ranging in size from 4 to 8 microns and an average pore size of about 6 microns. The film was reheated to 125° C. thereby yielding microporous film having an average pore size of 2 microns.

Example 12

Example 11 was repeated except that 100 parts of a commercially available ethylene-ethyl acrylate copolymer sold under the tradename "Zetafin" having a density of 0.929 and a melt index of 18.5 was substituted for the ethylene-vinyl acetate copolymer. On characterization, the irradiated, biaxially oriented film samples contained pores ranging in size from 4 to 8 microns and an average pore size of about 6 microns in diameter. The film on reheating to 125° C. yielded a crosslinked, microporous film having an average pore size of 2 microns in diameter.

What is claimed is:

1. A process for forming crosslinked oriented microporous, polyolefin film containing a plurality of pores having an average diameter of 0.1 to 10 microns which comprises forming a mixture consisting essentially of a polyolefin member of the group consisting of polyethylene, polypropylene and ethylene-vinyl copolymers, 20–400% by weight of said polyolefin group member of a finely divided pore-forming solid having an average diameter in the range 0.1 to 10 microns and 0.1 to 10% by weight of said polyolefin group member of an organic compound capable of generating free radicals, heating the mixture to above the melting point of the polyolefin group member but below the decomposition temperature of the organic compound, shaping the thus heated mixture in the form of film, crosslinking the shaped mixture by heating to at least the decomposition temperature of the organic compound, orienting the crosslinked film at a temperature within about 10° C. below its melting point up to its normal extrusion temperature and thereafter extracting the pore-forming solid at a temperature below the degradation temperature of the crosslinked polyolefin group member.

2. The process according to claim 1 wherein the polyolefin group member is oriented after extracting the pore-forming solid.

3. A process for forming crosslinked oriented microporous polyolefin film containing a plurality of pores having an average diameter of 0.1 to 10 microns which comprises forming a mixture consisting essentially of a polyolefin member of the group consisting of polyethylene, polypropylene and ethylene-vinyl copolymers and 20 to 400% by weight of said polyolefin group member of a finely divided pore-forming solid having an average diameter of 0.1 to 10 microns, heating the mixture to a temperature ranging from the melting point of the polyolefin group member up to 150° C. in excess thereof, shaping the heated mixture in the form of film, crosslinking the shaped mixture by irradiating with ionizing irradiation with a dosage of 0.1 to 100 megarads orienting the crosslinked film at a temperature within about 10° C. below its melting point up to its normal extrusion temperature and thereafter extracting the pore-forming solid at a temperature below the degradation temperature of the crosslinked polyolefin group member.

4. The process according to claim 3 wherein the polyolefin group member is oriented following the extraction of the pore-forming solid.

References Cited

UNITED STATES PATENTS

| | | | |
|---|---|---|---|
| 2,175,798 | 10/1939 | Hauser | 260—2.5 |
| 3,055,966 | 9/1962 | Sundberg | 260—2.5 |
| 3,062,760 | 11/1962 | Dermody et al. | 260—2.5 |
| 3,098,832 | 7/1963 | Pooley | 204—159.2 |
| 3,144,399 | 8/1964 | Rainer et al. | 204—159.2 |

MURRAY TILLMAN, *Primary Examiner.*

SAMUEL H. BLECH, *Examiner.*

J. C. BLEUTGE, *Assistant Examiner.*